US009722988B2

(12) United States Patent
Levy et al.

(10) Patent No.: US 9,722,988 B2
(45) Date of Patent: *Aug. 1, 2017

(54) TECHNIQUES FOR AUTHENTICATING A DEVICE FOR WIRELESS DOCKING

(71) Applicant: INTEL CORPORATION, Santa Clara, CA (US)

(72) Inventors: Elad Levy, Nes Ziona (IL); Michael Glik, Kfar Saba (IL); Paz Pentelka, Natania (IL); Yaron Kahana, Kfar Saba (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,717

(22) Filed: Sep. 22, 2015

(65) Prior Publication Data
US 2016/0087961 A1 Mar. 24, 2016

Related U.S. Application Data

(63) Continuation of application No. 13/794,656, filed on Mar. 11, 2013, now Pat. No. 9,173,095.

(51) Int. Cl.
H04L 9/08 (2006.01)
H04L 29/06 (2006.01)
H04W 12/06 (2009.01)
H04L 29/08 (2006.01)

(52) U.S. Cl.
CPC ............ *H04L 63/08* (2013.01); *H04L 9/0838* (2013.01); *H04L 63/06* (2013.01); *H04L 63/0876* (2013.01); *H04L 67/104* (2013.01); *H04W 12/06* (2013.01)

(58) Field of Classification Search
CPC ....... H04L 9/3228; H04L 9/0838; H04L 9/32; H04L 63/083; H04L 9/3273; H04L 9/3271; G06F 21/31
See application file for complete search history.

(56) References Cited

U.S. PATENT DOCUMENTS

2005/0111666 A1* 5/2005 Blom ................. H04L 63/0428
380/277
2007/0005972 A1 1/2007 Mizikovsky et al.
2007/0280169 A1 12/2007 Cam Winget
(Continued)

FOREIGN PATENT DOCUMENTS

JP 2004186800 7/2004
KR 10-20080067078 7/2008

OTHER PUBLICATIONS

Decision to Grant received for Japanese Patent Application No. 2015-558236, mailed Jul. 5, 2016, 3 pages.
(Continued)

Primary Examiner — David Pearson

(57) ABSTRACT

Examples are disclosed for a first device to wirelessly dock to a second device. In some examples, a first device may receive identification from the second device for wirelessly docking. The first device may determine whether the second device is allowed to wirelessly dock and if allowed an authentication process may be implemented. The first device may then wirelessly dock to the second device based on a successful authentication. Other examples are described and claimed.

31 Claims, 10 Drawing Sheets

(56) References Cited

U.S. PATENT DOCUMENTS

2008/0311906 A1    12/2008  Suh et al.
2009/0086973 A1     4/2009  Buddhikot et al.
2009/0164788 A1     6/2009  Cho et al.
2009/0169011 A1     7/2009  Zhao et al.

OTHER PUBLICATIONS

Extended European Search Report received for European Patent Application No. 14780011.4, mailed Oct. 16, 2016, 6 pages.

* cited by examiner

Information Element Format 200

| Vendor Identification 210 | Product Family Identification 220 | Product Identification 230 | MAC Address 240 |
|---|---|---|---|

*FIG. 2*

Allowed List 300

| List No. | Vendor ID | Product Family ID | Product ID | MAC Address |
|---|---|---|---|---|
| 310 | 100 | 10 | 01 | 315 |
| 320 | 100 | 10 | 02 | 325 |
| 330 | 200 | 20 | 01 | 335 |
| 340 | 200 | 20 | 01 | 345 |
| 350 | 300 | 30 | 01 | 355 |

```
RECEIVE, AT A FIRST DEVICE, A FIRST IE INCLUDING
IDENTIFICATION INFORMATION FOR A SECOND DEVICE
602
         │
         ▼
COMPARE THE IDENTIFICATION INFORMATION FOR THE
SECOND DEVICE TO A FIRST LIST OF ONE OR MORE
ALLOWED DEVICES FOR WIRELESSLY DOCKING TO THE FIRST
DEVICE
604
         │
         ▼
MODIFY A JOINTLY DERIVED PMK BASED ON THE
COMPARISON INDICATING THE SECOND DEVICE IS
APPROVED FOR WIRELESSLY DOCKING TO THE FIRST
DEVICE AND CAUSE THE FIRST DEVICE TO TRANSMIT A
MODIFY REQUEST MESSAGE TO DIRECT THE SECOND
DEVICE TO MODIFY THE PMK
606
         │
         ▼
AUTHENTICATE THE SECOND DEVICE USING THE
MODIFIED PMK
608
         │
         ▼
CAUSE THE FIRST DEVICE TO WIRELESSLY DOCK TO THE
SECOND DEVICE BASED ON A SUCCESSFUL
AUTHENTICATION
610
```

*FIG. 6*

Storage Medium 700

Computer Executable Instructions for 600

FIG. 7

Storage Medium *1000*

Computer Executable Instructions for 900

*FIG. 10*

TECHNIQUES FOR AUTHENTICATING A DEVICE FOR WIRELESS DOCKING

CROSS-REFERENCE TO RELATED APPLICATIONS

This application is a continuation of, claims the benefit of and priority to previously filed U.S. patent application Ser. No. 13/794,656 filed Mar. 11, 2013, entitled "Techniques for Authenticating a Device for Wireless Docking", the subject matter of which is incorporated herein by reference in its entirety.

TECHNICAL FIELD

Examples described herein are generally related to devices wirelessly docking.

BACKGROUND

Computing devices having wireless capabilities may communicatively couple to other devices having wireless capabilities via a wireless local area network (WLAN) using wireless technologies such as Wi-Fi™. Also, wireless technologies such as WiGig™, ultra wide band (UWB), Wireless USB™ or WirelessHD™ may allow wireless capable devices to replace wired interconnects with high speed and relatively short range wireless interconnects via a process typically referred to as wireless docking. The high speed and relatively short range wireless interconnects may allow devices to wirelessly dock with each other. One device may be a computing device such as a laptop or notebook and the other may be a type of input/output device such as a monitor or printer. In some examples, once wirelessly docked, the computing devices may utilize the input/output device in a same manner as if connected to the input/out device via a wired interconnect (e.g., routed through a physical docking station).

BRIEF DESCRIPTION OF THE DRAWINGS

FIG. 2 illustrates an example information element (IE) format.

FIG. 3 illustrates an example allowed list.

FIG. 6 illustrates an example of a first logic flow.

FIG. 7 illustrates an example of a first storage medium.

FIG. 10 illustrates an example of a second storage medium.

DETAILED DESCRIPTION

Figure 1:
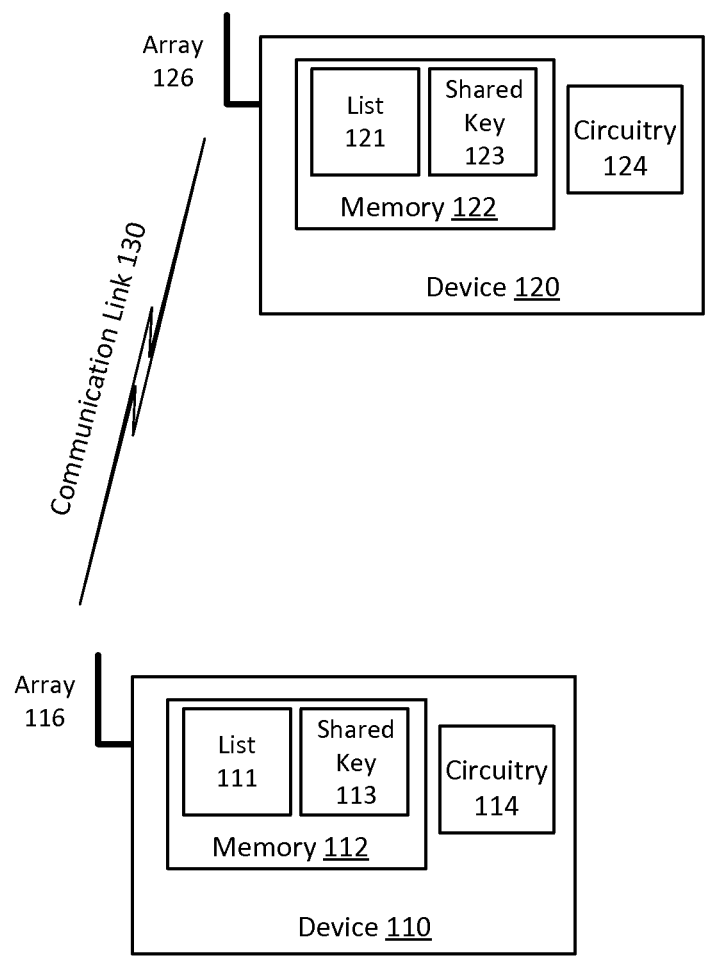
FIG. 1 illustrates an example of a system.

Examples are generally directed to improvements for wirelessly capable devices to wirelessly couple or wirelessly dock using wireless technologies to include but not limited to, Wi-Fi, WiGig, UWB, Wireless USB or WirelessHD. These wireless technologies may include establishing and/or maintaining wireless communication links through various frequency bands such as those used for Wi-Fi and/or WiGig, e.g., 2.4, 5 or 60 GHz. These wireless technologies may also include wireless technologies suitable for use with devices capable of coupling to other devices via a WLAN or via a peer-to-peer (P2P) wireless connection. For example, these devices may be configured to operate in compliance with various standards or specifications promulgated by the Institute of Electrical and Electronic Engineers (IEEE) or the Wi-Fi Alliance. These standards or specifications may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). These standards or specifications may also include the Wi-Fi Peer-to-Peer (P2P) Technical Specification, Version 1.2, published December 2011 ("Wi-Fi P2P").

In some examples various IEEE standards or specifications associated with IEEE 802.11 or Wi-Fi P2P such as IEEE 802.11a/g, IEEE 802.11ac, IEEE 802.11ad or IEEE 802.11i may be utilized by devices to establish or maintain a WLAN and/or a P2P communication link and/or establish wireless communications with each other (e.g., wireless docking). At least one of these devices may be or may have one or more input/output devices to possibly share or make jointly accessible upon wirelessly docking with the other device.

According to some examples, a first original equipment manufacturer (OEM) of a first device to include, but not limited to, a personal computer (PC), a server, a media center, an ultra-mobile PC, a notebook, a desktop, a mobile internet device (MID), a netbook a tablet or an Ultrabook™ may wirelessly dock to a second device not manufactured or at least approved by the first OEM for wirelessly docking to the first device. The first OEM in a wired-type docking deployment could limit coupling of the first device to the second device by controlling the physical form factor of a wired-type dock. However, wireless docks operated in compliance with IEEE 802.11 and/or Wi-Fi P2P standards or specifications likely may not have a controllable or proprietary form factor.

In some examples, the second device may be from a competing second OEM. In other examples, the second device may be a spoofing device that may damage the first device or gain access to sensitive information if wirelessly docked. In either of the examples, it may be beneficial to the first OEM and to a user of the first device to both verify that the second device is approved/allowed and authenticate the second device before establishing a wireless dock. It is with respect to these and other challenges that the examples described herein are needed.

According to some examples techniques may be implemented for a first device to wirelessly dock to a second device. For these examples, a first information element (IE) may be received at the first device. The first IE may include identification information for the second device. The first device may compare the identification information for the second device to a list of one or more allowed devices for wirelessly docking to the first device (e.g., provided by an OEM). A jointly derived pairwise master key (PMK) may then be modified based on the comparison indicating the second device is allowed for wirelessly docking to the first device. A modify request message may be transmitted to direct the second device to modify the PMK. The second device may then be authenticated using the modified PMK and a wireless dock may be established with the second device based on a successful authentication.

FIG. 1 illustrates an example system 100. In some examples, as shown in FIG. 1, system 100 includes a device 110 and a device 120. Also as shown in FIG. 1, device 110 and device 120 include arrays 116 and 126, respectively. Arrays 116 and 126 may each include one or more antennas capable of transmitting or receiving communication signals (e.g., via a 60 GHz frequency band) to wirelessly communicate at least some messages via communication link 130.

In some examples, as shown in FIG. 1, device 110 may include a memory 112 and circuitry 114 and device 120 may include a memory 122 and circuitry 124. As described more below, in some examples, circuitry 114 may execute one or more components to enable device 110 to authenticate device 120 for wireless docking. Also, circuitry 124 may execute one or more components to further facilitate device 110's efforts to authenticate and wirelessly dock to device 120.

Also, memory 112 and memory 122 may be types of memory to include non-volatile memory or volatile memory. According to some examples, a list 111 and a shared key 113 maintained at memory 112 may be used by components executed by circuitry 114 to determine whether device 120 is an allowed/approved device for wirelessly coupling to device 110 and to authenticate device 112 possibly using shared key 113. Also, in some examples, a list 121 and a shared key 123 maintained at memory 122 may be used by components executed by circuitry 124 to determine whether device 110 is an allowed/approved device for wirelessly coupling to device 120 and to implement the authentication process with device 110 possibly using shared key 123. In some examples, shared keys 113 and 123 may be a same key that may also be referred to as a pre-shared key.

According to some examples, list 111 and shared key 113 may be compiled or configured by an OEM of device 110. For these examples, list 111 may have identification information for devices that may be allowed to wirelessly dock to device 110. Also, to facilitate authentication of devices via which device 110 attempts to wirelessly dock, shared key 113 may be a pre-configured private key maintained in a secure portion of memory 112. The pre-configured private key included in shared key 113 may have been placed in that secure portion at the OEM's factory or prior to deployment of device 110 to its intended user or prior to delivery to a final point of sale.

Similarly, in some examples, list 121 and shared key 113 of device may be compiled or configured by either the same OEM of device 110 or by an authorized agent of the same OEM. For these examples, list 121 may have similar identification information for devices that may be allowed to wirelessly dock to device 120. Also, to facilitate authentication of devices via which device 120 attempts to wirelessly dock, shared key 123 may also be a pre-configured private key maintained in a secure portion of memory 122. Similar to shared key 113, the pre-configured private key included in shared key 123 may have been placed in that secure portion at the OEM's factory, prior to deployment or prior to delivery to a final point of sale.

In some examples, devices 110 and 120 may be arranged to operate according to the one or more wireless network technologies associated with Wi-Fi P2P or IEEE 802.11 such as IEEE 802.11ad, IEEE 802.11i or the Wi-Fi P2P specification. In some examples, circuitry 114 at device 110 and circuitry 124 at device 120 may each include logic and/or features (e.g., chipsets, processor circuits, memory, protocol stacks, etc.) to operate according to IEEE 802.11ad, IEEE 802.11i and/or the Wi-Fi P2P specification to establish, transmit or receive communication signals via various frequency bands as described in these standards or specifications.

In some examples, device 110 and/or device 120 may be a computing device. The computing device may be a computer primary device as described in the Wi-Fi P2P specification. These types of computer primary device may include but is not limited to a personal computer (PC), a server, a media center, an ultra-mobile PC, a notebook, a desktop, a mobile internet device, a netbook a tablet or an ultrabook.

In other examples, device 110 and/or device 120 may have one or more input/output device. The input/output device may be one of several types of devices. An input/output device may include input devices such as a keyboard, a mouse, a joystick, a trackball, a gaming controller, a remote, a touchscreen, a biometric reader or a barcode reader. An input/output device may also include printer, scanner, faxes and copiers such as a printer, a print server, a scanner, a fax, a copier or an all-in-one (printer, scanner fax, copier). An input/output device may also include a camera such as a digital still camera, a video camera, a web camera or a security camera. An input/output device may also include a storage device such as network accessible storage (NAS). An input/output device may also include network infrastructure such as an access point (AP), a router, a switch or a gateway. An input/output device may also include displays such as a television, an electronic picture frame, a projector or a monitor. An input/output device may also include multimedia devices such as a digital audio recorder (DAR), a personal video recorder (PVR), a media center extender (MCX), a set-top box, a media server, a media adapter, a media extender or a portable video player. An input/output device may also include gaming devices such as a game console, a game console adapter or a portable gaming device. An input/output device may also include a telephone such as a single mode phone, a dual mode phone, a single mode smartphone or a dual mode smartphone. An input/output device may also include audio devices such as an audio tuner, an audio receiver, one or more speakers, a portable music player, a headset (headphones+microphone), headphones or a microphone. An input/output device may also include docking devices such as a computing docking station or a media kiosk. This disclosure is not limited to the above listed input/output devices.

According to some examples, device 110 or device 120 may initiate a P2P device discovery process via transmission of a probe request message and the receiver of the probe request message may respond with a probe response message. As described more below, device 110 and device 120 may then exchange additional messages based on whether each device is allowed according to their respectively maintained lists. Then, based upon a successful authentication, devices 110 and 120 may wirelessly dock.

FIG. 2 illustrates an example information element (IE) format 200. According to some examples, IE format 200 may convey identification information in messages exchanged between devices. For examples, the exchanged messages may include probe request and probe response messages associated with a P2P device discovery between two devices such a device 110 and device 120. In some examples, the P2P device discovery may be carried out or implemented in accordance with the Wi-Fi P2P specification.

In some examples, as shown in FIG. 2, IE format 200 may include a vendor identification 210, a product family identification 220, a product identification 230 and a media access control (MAC) address 240. For these examples, the identification information included in these fields may provide unique identification information for a given device. Similar to the lists and shared keys mentioned above for devices 110 and 120, identification information for a given device may be compiled or configured by an OEM of the given device at the OEM's factor, prior to deployment or prior to delivery to a final point of sale.

FIG. 3 illustrates an example allowed list 300. According to some examples, as shown in FIG. 3, allowed list 300 includes an example list of devices. Although the list shows identification information for five devices, a list of any size is contemplated by this disclosure. Provided a memory capable of maintaining the list (e.g., memory 112 or 122) has available capacity. In some examples, at least a portion of the list may be maintained in memory remotely accessible to the device (e.g., via a secure network connection). For these examples, available memory capacity may not be a substantial limiting factor to the size of the list.

According to some examples, a list similar to allowed list 300 may be accessible to and/or maintained at or with devices such as device 110 or device 120. As described more below, respectively maintained lists may be used by the devices to determine whether wirelessly docking to other devices is allowed.

In some examples, as shown in FIG. 3, list nos. 310, 320, 330, 340 and 350 separately include identification information for devices having respective MAC addresses of 315, 325, 335, 345 and 355. For the example MAC addresses in FIG. 3, the numbers are shown to depict the uniqueness of the address for a given device on the list and do not represent actual MAC addresses that may be used for devices operating in compliance with, for example, IEEE 802.11 standards such as IEEE 802.11ad. Likewise, the numbers depicted for vendor ID, product family ID and Product ID are numbers to show uniqueness and do not attempt to represent actual IDs possibly associated with vendors, product families or products.

Figure 4:
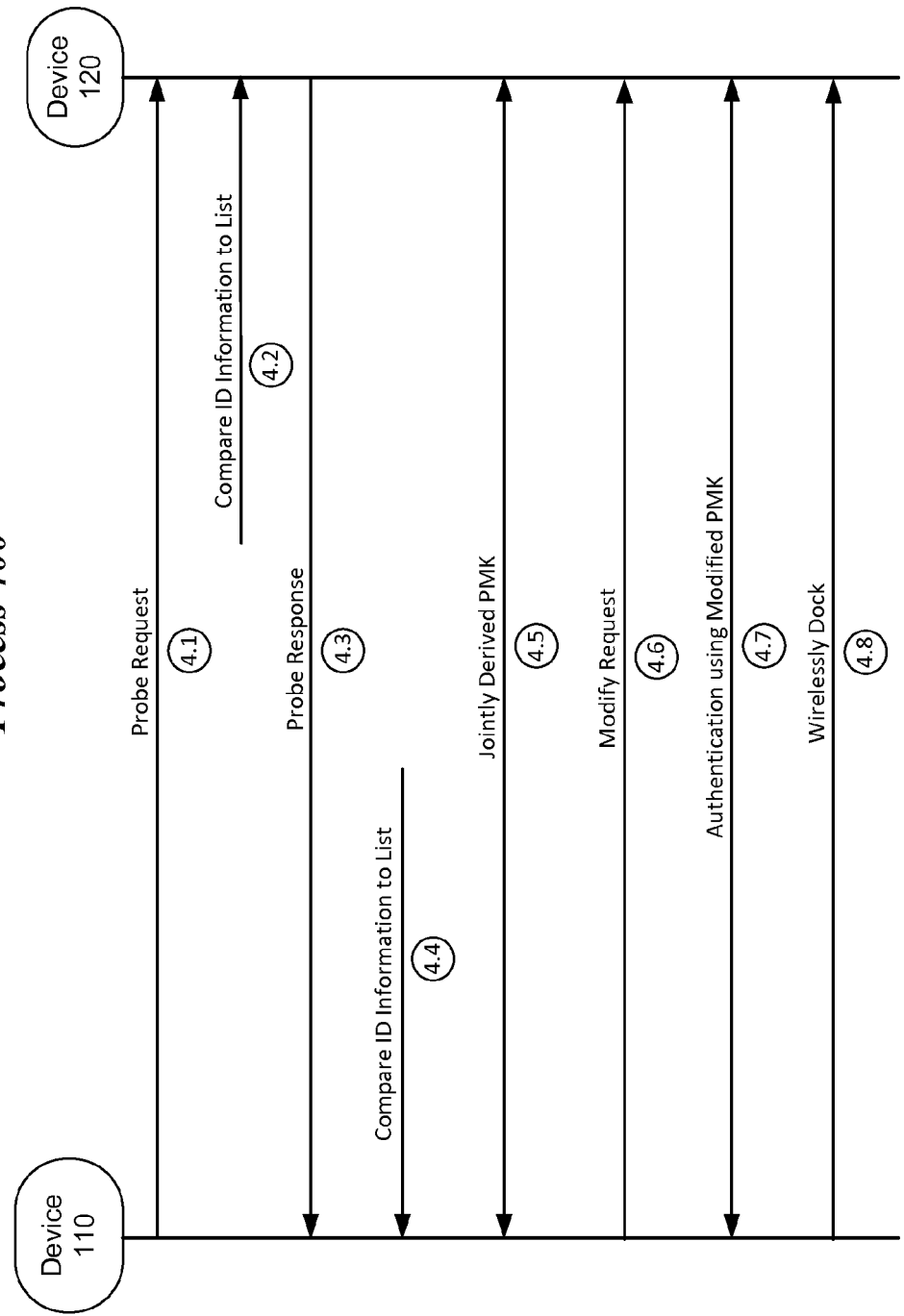
FIG. 4 illustrates an example process.

FIG. 4 illustrates an example process 400. In some examples, elements of system 100, as shown in FIG. 1 may be used to illustrate example operations related to the process 400 depicted in FIG. 4. The described example operations are not limited to implementations on system 100 or to the elements describe therein for FIG. 1 or to the IE format and the list described for FIG. 2 or 3.

Starting at process 4.1 (Probe Request), logic and/or features at a first device such as device 110 may cause the first device to transmit a probe request message. According to some examples, the probe request may be associated with a P2P device discovery to enable device 110 to identify other devices to possibly establish a P2P connection (e.g., in accordance with the Wi-Fi P2P specification). The P2P connection, once established, may result in a wireless dock between the first device and a second device such as device 120. As shown in FIG. 4, the probe request may be received by device 120. Although not shown in FIG. 4, other devices may also receive a probe request as part of a broadcast of probe requests transmitted from device 110.

In some examples, the probe request transmitted from device 110 may include a first IE having identification information for device 110. The first IE may be in the example format of IE format 200 as described for FIG. 2. In the example format of IE format 200 the identification information may include a vendor identification, a product family identification, a product identification or a MAC address.

Proceeding to process 4.2 (Compare ID Information to List), logic and/or features at mobile device 120 may be capable of receiving the probe request that includes the first IE having the identification information for device 110. In some examples, the logic and/or features at device 120 may compare the identification information from the first IE to a first list maintained at or accessible to device 120. For example, the first list may be list 121 maintained at memory 122. List 121 may be similar to allowed list 300 shown in FIG. 3 and if the identification information from the first IE matches a listed device on list 121, the logic and/or features may determine that mobile device 110 is an allowed device for which device 120 may wirelessly dock.

According to some examples, if the identification information from the first IE does not match a listed device on list 121, logic and/or features at device 120 may cause device 120 to transmit an error or rejection message. For these examples, the error or rejection message may indicate to device 110 that its identification information is not among a list of approved devices.

Proceeding to process 4.3 (Probe Response), logic and/or features at device 120, based on device 110's identification information in the first IE being on list 121, may cause a probe response to be transmitted to device 110. In some examples, the probe response may include a second IE having identification information for device 120. For these examples, the second IE may also be in the example format of IE format 200.

Proceeding to process 4.4 (Compare ID Information to List), logic and/or features at device 110 may be may be capable of receiving the probe response that includes the second IE having the identification information for device 120. According to some examples, the logic and/or features at device 110 may compare the identification information from the second IE to a second list maintained at or accessible to device 110. For example, the second list may be list 111 maintained at memory 112. List 111 may be similar to allowed list 300 shown in FIG. 3 and if the identification information from the second IE matches a listed device on list 111, the logic and/or features may determine that mobile device 120 is an allowed device for which device 110 may wirelessly dock.

Proceeding to process 4.5 (Jointly Derived PMK), both device 110 and device 120 may jointly derive a PMK following separate determinations that the other device is an allowed device. According to some examples, the PMK may be derived from a key generated by an extensible authentication protocol (EAP) method. For these examples, the EAP method may be in accordance with one or more wireless communication standards associated with IEEE 802.11 to include IEEE 802.11i. According to some examples, device 110 and device 120 may separately obtain the key used to derive the PMK via a secure authentication mechanism with a Network Access Server operating in compliance with IEEE 802.1X—2010, Port Based Network Access Control, Published February 2010, and/or other versions of this standard ("IEEE 802.1X).

Proceeding to process 4.6 (Modify Request), logic and/or features at device 110 may cause device 110 to transmit a modify request message to device 120. In some examples, the modify request message may include a directive for device 120 to modify its derived PMK. For these examples, the directive may include having device 120 modify its PMK by one or an XOR logical operations with a pre-shared key maintained at both device 110 and device 120. For example, the pre-shared key may be maintained in shared keys 113 and 123 of devices 110 and 120, respectively. In other examples, the directive may include having device 120 implement a hash function using the pre-shared key.

According to some examples, rather than using a pre-shared key, the directive included in the modify request message may cause device 120 to implement an algorithm included in the directive to modify the PMK. For these examples, logic and/or features at device 110 would then use the same or shared algorithm to modify its PMK. In other examples, the directive may cause device 120 to concatenate information included in the directive to the PMK. Similar to the shared algorithm, logic and/or features at device 110 would also concatenate the information to modify its PMK in the same manner as device 120 was directed. Both of the above examples provide a way to modify PMK without the need of having and/or use a pre-shared key maintained at both devices.

In some examples, logic and/or features at device 110 may use the same method to modify its PMK as was directed by the directive included in the modify request message transmitted to device 120. For these examples, using the same method should enable both devices to arrive at a same modified PMK for subsequent use that may lead to an eventual authentication of device 120 for wirelessly docking to device 110.

Proceeding to process 4.7 (Authentication using Modified PMK), logic and/or features at device 110 and device 120 may use their respective modified PMKs to implement an authentication process. According to some examples, the authentication process may include a four-way handshake process in accordance with IEEE 802.11i using the modified PMK.

Proceeding to process 4.8 (Wirelessly Dock), logic and/or features at device 110, based on a successful authentication of device 120, may wirelessly dock to device 120. In some examples, the logic and/or features at device 110 may cause device 110 to wirelessly dock to device 120 in accordance with IEEE 802.11ad. The process may then come to an end.

Figure 5:
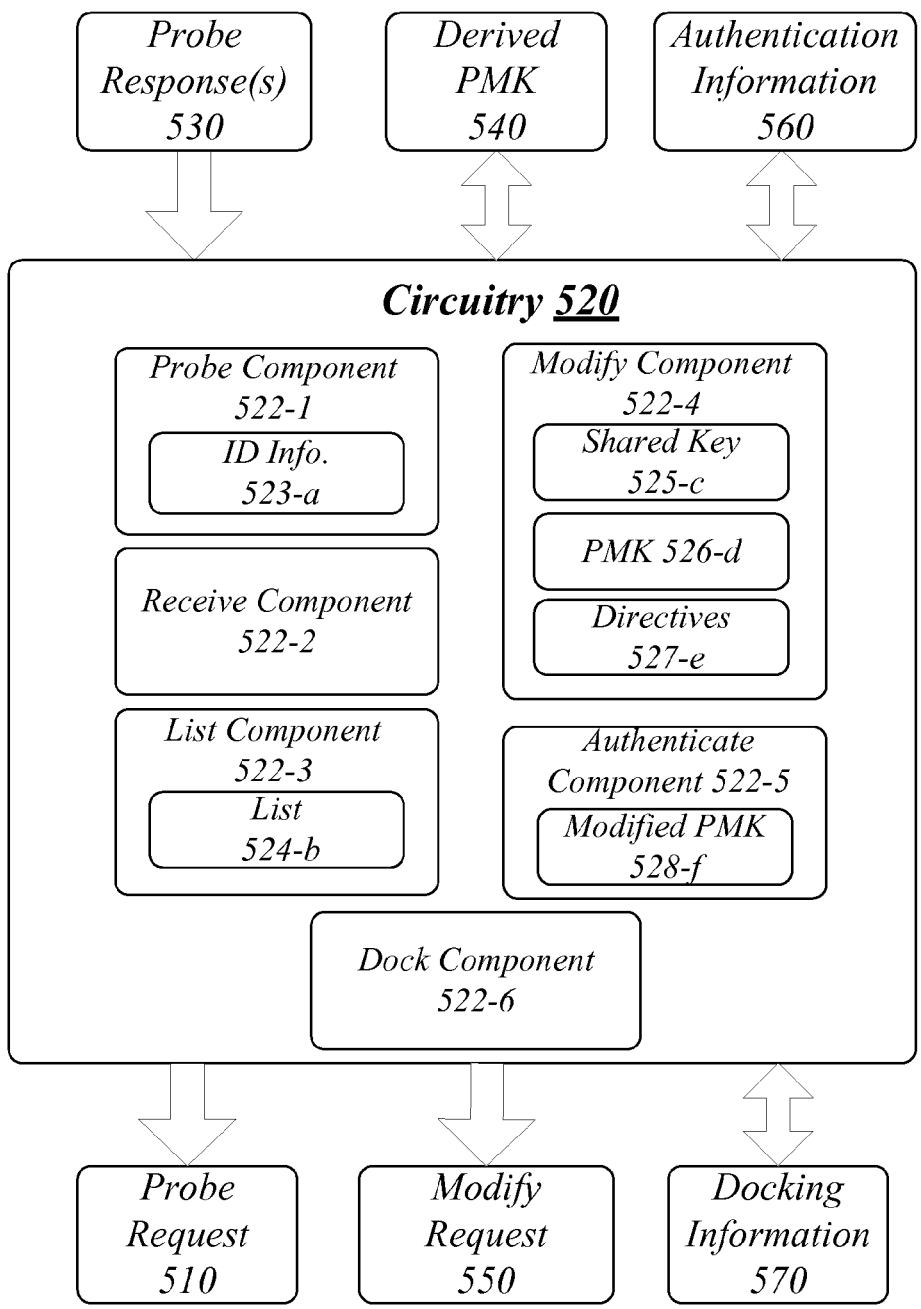
FIG. 5 illustrates an example block diagram for a first apparatus.

FIG. 5 illustrates a block diagram for a first apparatus. As shown in FIG. 5, the first apparatus includes an apparatus 500. Although apparatus 500 shown in FIG. 5 has a limited number of elements in a certain topology or configuration, it may be appreciated that apparatus 500 may include more or less elements in alternate configurations as desired for a given implementation.

The apparatus 500 may include a computer and/or firmware implemented apparatus 500 having circuitry 520 arranged to execute one or more components 522-*a*. It is worthy to note that "a" and "b" and "c" and similar designators as used herein are intended to be variables representing any positive integer. Thus, for example, if an implementation sets a value for a=6, then a complete set of components 522-*a* may include modules 522-1, 522-2, 522-3, 522-4, 522-5 or 522-6. The embodiments are not limited in this context.

According to some examples, apparatus 500 may be part of a device that may be capable of operating in compliance with one or more wireless technologies such as those described in or associated with the IEEE 802.11 standards and/or the Wi-Fi P2P specification. For example, the device having apparatus 500 may be arranged or configured to wirelessly couple to another device having via a wireless dock established and/or operated according to IEEE 802.11ad or IEEE 802.11i. The examples are not limited in this context.

In some examples, as shown in FIG. 5, apparatus 500 includes circuitry 520. Circuitry 520 may be generally arranged to execute one or more components 522-*a*. Circuitry 520 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as circuitry 520. According to some examples circuitry 520 may also be an application specific integrated circuit (ASIC) and components 522-*a* may be implemented as hardware elements of the ASIC.

According to some examples, apparatus 500 may include a probe component 522-1. Probe component 522-1 may be executed by circuitry 520 to a cause a first device having an apparatus 500 to transmit a probe request message associated with a P2P device discovery. For these examples, probe component 522-1 may include the probe request message in probe request 510. Also, probe component 522-1 may maintain ID info. 523-*a* in a data structure such as a lookup table (LUT). ID info. 523-*a* may include identification information for probe component 522-1 to add an IE to probe request 510. The IE may include identification information for the first device and may be in the format of example IE format 200 as shown in FIG. 2. This identification information may be used by a second device that receives probe request 510 to determine whether the first device is allowed to wirelessly couple to the second device (e.g., via comparison to a list maintained at the second device).

In some examples, apparatus 500 may also include a receive component 522-2. Receive component 522-2 may be executed by circuitry 520 to receive probe response(s) 530. For these examples, probe response(s) 530 may have been sent by the second device responsive to the second device receiving probe request 510 and determining that the first device was on a list of allowed devices for wireless docking. Probe response(s) 530 may include an IE having identification information for the second device.

According to some examples, apparatus 500 may also include a list component 522-3. List component 522-3 may be executed by circuitry 520 to compare the identification information for the second device in the IE included in probe response(s) 530 to a list of one or more allowed devices for wirelessly docking to the first device. For these examples, the list may be in the example format of allowed list 300 shown in FIG. 3 and may be maintained in a LUT or other type of data structure maintained at the first device.

In some examples, apparatus 500 may also include a modify component 522-4. Modify component 522-4 may be executed by circuitry 520 to modify a jointly derived PMK. For these examples, the jointly derived PMK may be obtained from derived PMK 504 from a key generated by an EAP method in accordance with IEEE 802.11i. The derived PMK may be then at least temporarily maintained in PMK 526-*d* (e.g., in a LUT or other data structure) by modify component 522-4. The PMK may then be modified and a corresponding modify request message may be caused to be included in modify request 550 and transmitted to the second device.

According to some examples, a directive may also be included in modify request 550. The directive may have been obtained from directives 527-*e* (e.g., maintained in a LUT or other data structure) and may direct the second device to modify the PMK jointly derived from the key generated by the EAP method. For these examples, modify component 522-4 may also modify the PMK at the first device in the same manner as indicated in the directive included in modify request 550 transmitted to the second device. The directive from directives 527-*e* may include an XOR logical operation with a pre-shared key maintained at both the first device (e.g., maintained at shared key 525-*c*) and the second device. The directive may also include implementing a hash function using the pre-shared key, implementing an algorithm include in the directive or concatenate information included in the directive to the PMK.

According to some examples, apparatus 500 may also include an authenticate component 522-5. Authenticate component 522-5 may be executed by circuitry 520 to authenticate the second device using the modified PMK. For these examples, the PMK modified by modify component 522-4 may be at least temporarily maintained by authenticate component 522-5 with modified PMK 528-*f* (e.g., in a LUT). Also, for these examples, authentication information 560 may be exchanged with the second device. Authentication information 560 may be associated with implementing an authentication process that may include a four-way handshake process in accordance with IEEE 802.11i using the modified PMK.

According to some examples, apparatus 500 may also include a dock component 522-6. Dock component 522-6 may be executed by circuitry 520 to cause the first device to wirelessly dock to the second device based on a successful authentication of the second device. For these examples, docking information 570 may then be exchanged with the second device to establish the wireless dock. The wireless dock may be established in accordance with at least one or more wireless communication standards or specifications associated with the Wi-Fi P2P specification or the IEEE 802.11 standard such as IEEE 802.11ad.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example of a first logic flow. As shown in FIG. 6, the first logic flow includes a logic flow 600. Logic flow 600 may be representative of some or all of the operations executed by one or more logic, features, or devices described herein, such as apparatus 500. More particularly, logic flow 600 may be implemented by probe component 522-1, receive component 522-2, list component 522-3, modify component 522-4, authenticate component 522-5 or dock component 522-6.

In the illustrated example shown in FIG. 6, logic flow 600 at block 602 may receive, at a first device, a first IE including identification information for a second device. For these examples, receive component 522-2 may receive the first IE in a probe response message included in probe response(s) 530.

According to some examples, logic flow 600 at block 604 may compare the identification information for the second device to a first list of one or more allowed devices for wirelessly docking to the first device. For these examples, list component 522-3 may conduct the comparison to determine whether the second device is listed on the first list of allowed devices.

In some examples, logic flow 600 at block 606 may modify a jointly derived PMK based on the comparison indicating the second device is approved (e.g., on the list) for wirelessly docking to the first device. Logic flow 600 at block 606 may also cause the first device to transmit a modify request message to direct the second device to modify the PMK. As mentioned above, modify component 522-4 may modify the PMK at the first device and provide a directive in the modify request message for the second device to modify its PMK in a similar manner.

According to some examples, logic flow 600 at block 608 may authenticate the second device using the modified PMK. For these examples, authenticate component 522-5 may implement an authentication process that may include a four-way handshake process in accordance with IEEE 802.11i that uses the modified PMK.

According to some examples, logic flow 600 at block 610 may cause the first device to wirelessly dock to the second device based on a successful authentication. For these examples, dock component 522-6 may exchange docking information 570 with the second device to wirelessly dock to the second device. The wireless dock may be established in accordance with at least one or more wireless communication standards or specifications associated with the Wi-Fi P2P specification or the IEEE 802.11 standard such as IEEE 802.11ad.

FIG. 7 illustrates an embodiment of a first storage medium. As shown in FIG. 7, the first storage medium includes a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
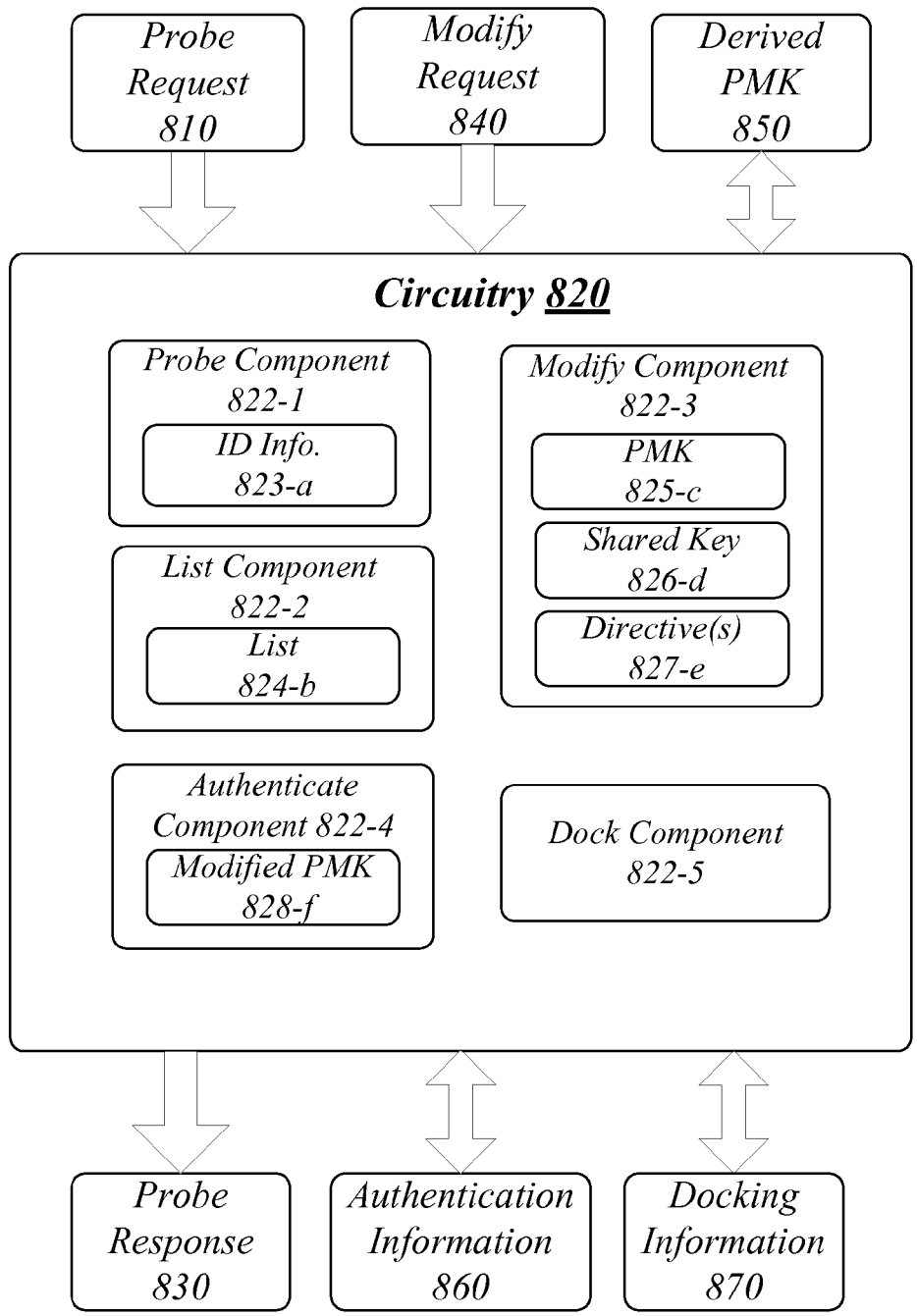
FIG. 8 illustrates an example block diagram for a second apparatus.

FIG. 8 illustrates a block diagram for a second apparatus. As shown in FIG. 8, the second apparatus includes an apparatus 800. Although apparatus 800 shown in FIG. 8 has a limited number of elements in a certain topology or configuration, it may be appreciated that apparatus 800 may include more or less elements in alternate configurations as desired for a given implementation.

The apparatus 800 may comprise a computer-implemented apparatus 800 having circuitry 820 arranged to execute one or more components 822-*a*. Similar to apparatus 500 for FIG. 5, "a" and "b" and "c" and similar designators may be variables representing any positive integer.

According to some examples, apparatus 500 may be part of a device that may be capable of operating in compliance with one or more wireless technologies such as those described in or associated with the IEEE 802.11 standards and/or the Wi-Fi P2P specification. For example, the device having apparatus 500 may be arranged or configured to respond to a probe request message and wirelessly couple to another device having via a wireless dock established and/or operated according to IEEE 802.1 lad or IEEE 802.11i. The examples are not limited in this context.

In some examples, as shown in FIG. 8, apparatus 800 includes circuitry 820. Circuitry 820 may be generally arranged to execute one or more components 822-a. The circuitry 820 can be any of various commercially available processors to include, but not limited to, those previously mentioned for circuitry 520 for apparatus 500. Dual microprocessors, multi-core processors, and other multi-processor architectures may also be employed as circuitry 820. According to some examples circuitry 820 may also be an application specific integrated circuit (ASIC) and components 822-a may be implemented as hardware elements of the ASIC.

According to some examples, apparatus 800 included in a first device to wirelessly dock to a second device may include a probe component 822-1. Probe component 822-1 may be executed by circuitry 820 to receive a probe request message in probe request 810 from the second device in association with a P2P device discovery initiated by the first device.

In some examples, apparatus 800 may also include a list component 822-2. List component 822-2 may be executed by circuitry 820 to determine whether the second device is allowed to wirelessly dock to the first device based on an IE included in probe request 810 that has identification information for the second device. For these examples, list component 822-2 may compare the identification information for the second device to a first list of allowed devices for wirelessly docking to the first device. The first list may be maintained with list 824-b (e.g., in a LUT or other data structure). If the identification information indicates the second device is on the first list of allowed devices, list component 822-2 may deem the second device as an allowed device for wireless docking.

According to some examples, list component 822-2 may have deemed the second device as allowed for wireless docking to the first device. For these examples, that allowed determination may be indicated to probe component 822-1. Probe component 822-1 may then cause a probe response message to be transmitted from the first device in probe response 830. For these examples, the probe response message may include an IE having identification information for the first device.

In some examples, list component 822-2 may determine that the second device is not on the first list. For these examples, component 822-2 may indicate to probe component 822-1 that the second device is not allowed for wirelessly docking to the first device. Probe component 822-1 may cause the first device to include an error or rejection message in probe response 830 to indicate to the second device that it was deem as not allowed for wirelessly docking to the first device.

According to some examples, apparatus 800 may also include a modify component 822-3. Modify component 822-3 may be executed by circuitry 820 to receive a modify request message in modify request 840 from the second device. The modify request may include information to direct modify component 822-3 to modify a jointly derived PMK. For these examples, the jointly derived PMK may be obtained from derived PMK 850 via a key generated by an EAP method in accordance with IEEE 802.11i. The derived PMK may be at least temporarily maintained in PMK 825-c (e.g., in a LUT or other data structure).

According to some examples, the information to direct modify component 822-3 to modify the PMK derived via the key generated by the EAP method may also include one or more directives to describe or direct the method to use to modify the PMK. The one or more directives may be at least temporarily maintained by modify component 822-3 in directives 827-e (e.g., maintained in a LUT or other data structure). The one or more directives may include an XOR logical operation with a pre-shared key maintained at both the first device (e.g., maintained at shared key 826-d) and the second device. The directive may also include implementing a hash function using the pre-shared key, implementing an algorithm include in the one or more directives or concatenate information included in the one or more directives to the PMK.

In some examples, apparatus 800 may also include an authenticate component 822-4. Authenticate component 822-4 may be executed by circuitry 820 to implement an authentication process with the second device using the modified PMK. For these examples, the PMK modified by modify component 822-3 may be at least temporarily maintained by authenticate component 822-4 with modified PMK 828-f (e.g., in a LUT). Also, for these examples, authentication information 560 may be exchanged with the second device. Authentication information 860 may be associated with implementing the authentication process that may include a four-way handshake process in accordance with IEEE 802.11i using the modified PMK.

According to some examples, apparatus 800 may also include a dock component 822-5. Dock component 822-5 may be executed by circuitry 820 to cause the first device to wirelessly dock to the second device based on a successful authentication. For these examples, docking information 870 may then be exchanged with the second device to establish the wireless dock. The wireless dock may be established in accordance with at least one or more wireless communication standards or specifications associated with the Wi-Fi P2P specification or the IEEE 802.11 standard such as IEEE 802.11ad.

Various components of apparatus 800 and a device implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 9:
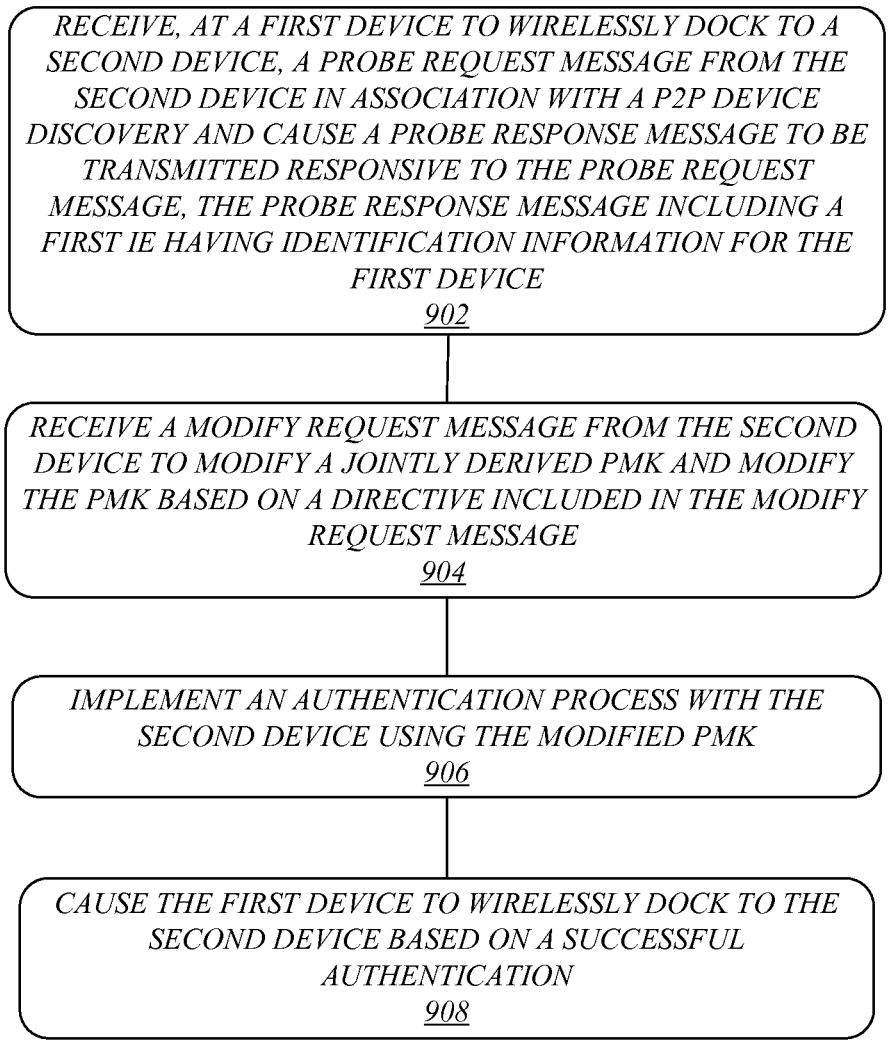
FIG. 9 illustrates an example of a second logic flow.

FIG. 9 illustrates an example of a second logic flow. As shown in FIG. 9, the second logic flow includes a logic flow 900. Logic flow 900 may be representative of some or all of the operations executed by one or more logic, features, or devices described herein, such as apparatus 900. More particularly, logic flow 900 may be implemented by probe component 822-1, list component 822-2, modify component 822-3, authenticate component 822-4 or dock component 822-5.

In the illustrated example shown in FIG. 9, logic flow 900 at block 902 may receive, at a first device to wirelessly dock to a second device, a probe request message from the second device in association with a P2P device discovery. Logic flow 900 at block 902 may also cause a probe response message to be transmitted responsive to the probe request message. For these examples, probe component 822-1 may receive the probe request message in probe request 810 and may cause the probe response message to be transmitted from the first device in probe response 830. The probe response message may be transmitted based on list component 822-2 determining that identification information included in the probe request for the second device indicates the second device is on a first list of allowed devices to wirelessly dock to the first device. The responsive probe response message may include an IE having identification information for the first device. The IE may be used by the second device to likewise determine whether the first device is on a second list of allowed devices to wireless dock to the second device.

According to some examples, logic flow 900 at block 904 may receive a modify request message from the second device to modify a jointly derived PMK and modify the PMK based on a directive included in the modify request message. For these examples, modify component 822-3 may carry out the modifications to the PMK according to the directive included in a modify request message included in modify request 840.

According to some examples, logic flow 900 at block 906 may implement an authentication process with the second device using the modified PMK. For these examples, authenticate component 822-4 may implement an authentication process that may include a four-way handshake process in accordance with IEEE 802.11i that uses the modified PMK.

In some examples, logic flow 900 at block 908 may cause the first device to wirelessly dock to the second device based on a successful authentication. For these examples, dock component 822-5 may exchange docking information 870 with the second device to cause the wirelessly dock to the second device. The wireless dock may be established in accordance with at least one or more wireless communication standards or specifications associated with the Wi-Fi P2P specification or the IEEE 802.11 standard such as IEEE 802.11ad.

FIG. 10 illustrates an embodiment of a first storage medium. As shown in FIG. 10, the first storage medium includes a storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
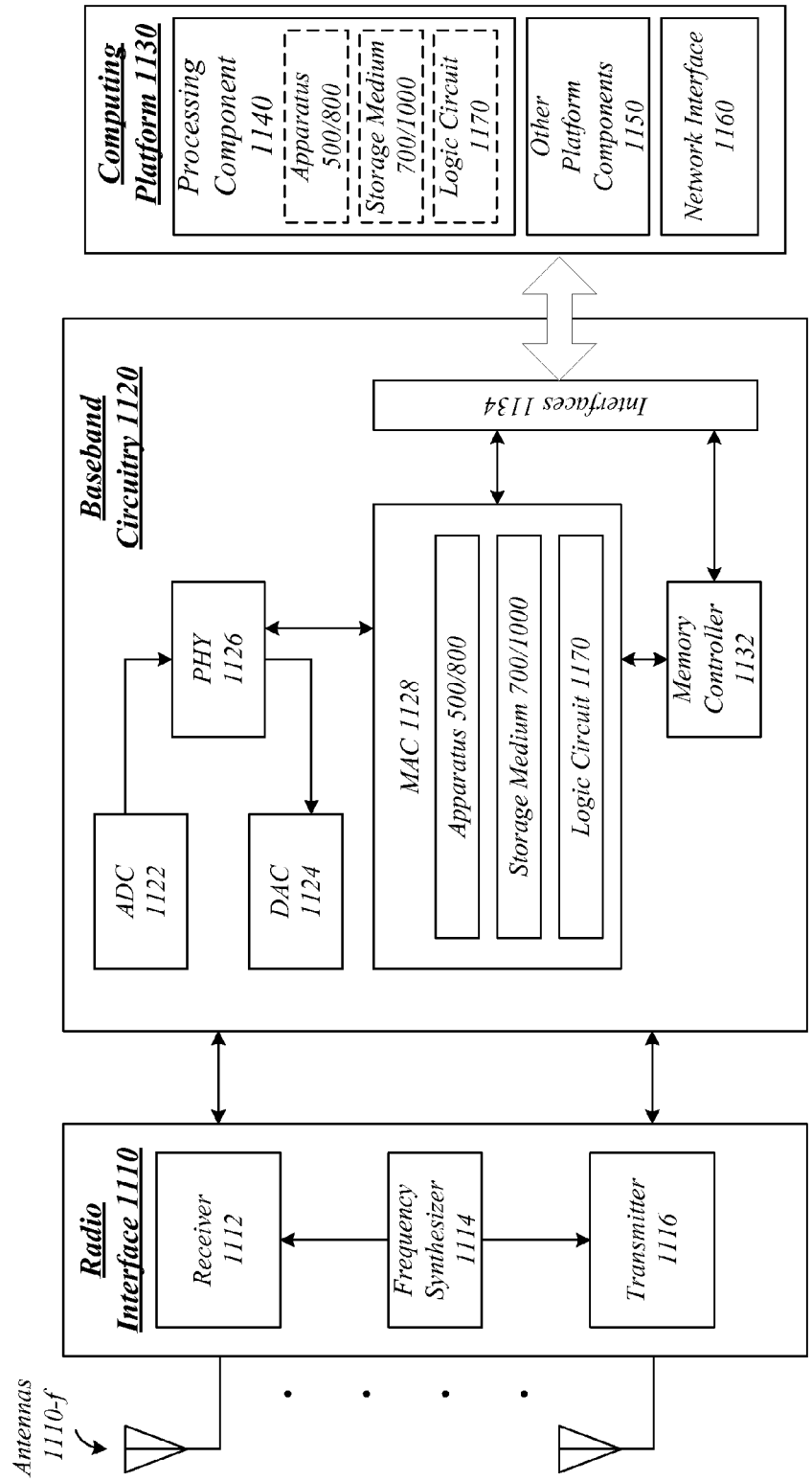
FIG. 11 illustrates an example of a device.

FIG. 11 illustrates an embodiment of a device 1100. In some examples, device 1100 may be configured or arranged for wireless communications in a wireless network. Device 1100 may implement, for example, apparatus 500/800, storage medium 700/1000 and/or a logic circuit 1170. The logic circuit 1170 may include physical circuits to perform operations described for apparatus 500/800. As shown in FIG. 11, device 1100 may include a radio interface 1110, baseband circuitry 1120, and computing platform 1130, although examples are not limited to this configuration.

The device 1100 may implement some or all of the structure and/or operations for apparatus 500/800, storage medium 700/1000 and/or logic circuit 1170 in a single computing entity, such as entirely within a single device. The embodiments are not limited in this context.

radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118-f. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with MAC processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames (e.g., containing subframes). Alternatively or in addition, MAC processing circuit 1128 may share processing for certain of these functions or perform these processes independent of PHY processing circuit 1126. In some embodiments, MAC and PHY processing may be integrated into a single circuit.

Computing platform 1130 may provide computing functionality for device 1100. As shown, computing platform 1130 may include a processing component 1140. In addition to, or alternatively of, baseband circuitry 1120 of device 1100 may execute processing operations or logic for apparatus 500/800, storage medium 700/1000, and logic circuit 1170 using the processing component 1130. Processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1130 may further include a network interface 1160. In some examples, network interface 1160 may include logic and/or features to support network interfaces operated in compliance with one or more wireless broadband technologies such as those described in one or more standards associated with IEEE 802.11 such as IEEE 802.11ad.

Device 1100 may be, for example, user equipment, a computer, a personal computer (PC), a desktop computer, a laptop computer, a notebook computer, a netbook computer, a tablet computer, an ultrabook computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated with the Wi-Fi P2P specification and/or IEEE 802.11 Standards for WLANs, wireless docking or P2P connections, although the examples are not limited in this respect.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using multiple input multiple output (MIMO) communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example first apparatus for a first device to wirelessly dock to a second device may include circuitry. For these examples, a receive component may be executed by the circuitry to receive a first information element (IE) including identification information for the second device. A list component may also be executed by the circuitry to compare the identification information for the second device to a first list of one or more allowed devices for wirelessly docking to the first device. A modify component may also be executed by the circuitry to modify a jointly derived PMK based on the comparison indicating the second device is approved for wirelessly docking to the first device and cause the first device to transmit a modify request message to direct the second device to modify the PMK. An authenticate component may also be executed by the circuitry to authenticate the second device using the modified PMK. A dock component may be executed by the circuitry to cause the first device to wirelessly dock to the second device based on a successful authentication.

According to some examples, the example first apparatus may also include a probe component to also be executed by the circuitry to cause the first device to transmit a probe request message associated with a P2P device discovery. For these examples, the received first IE included in a probe response message transmitted by the second device responsive to receiving the probe request message.

In some examples for the example first apparatus, the probe request message may have a second IE including identification information for the first device. For these examples, the probe response message sent by the second device based on a comparison of the identification information for the first device to a second list of approved devices for wirelessly docking to the second device.

According to some examples for the example first apparatus, the identification information for the first and second devices may separately include identifier information based on one or more of a vendor identification, a product family identification, a product identification or a media access control (MAC) address for the second device.

In some examples for the example first apparatus, the first and second devices may be capable of operating in compliance with at least one or more wireless communication standards associated with the IEEE 802.11 standards.

According to some examples for the example first apparatus, the modify request message may include a directive for the second device to modify the PMK jointly derived from a key generated by an EAP method in accordance with at least one or more wireless communication standards associated with the IEEE 802.11 standards to include IEEE 802.11i.

In some examples for the example first apparatus, the directive may include the second device to modify the PMK by one of an XOR logical operation with a pre-shared key maintained at both the first and second devices, implement a hash function using the pre-shared key, implement an algorithm included in the directive or concatenate information included in the directive to the PMK.

According to some examples for the example first apparatus, the authenticate component may authenticate the second device via a four-way handshake process in accordance with IEEE 802.11i using the modified PMK.

In some examples for the example first apparatus, the dock component may cause the first device to wirelessly dock to the second device in accordance with at least one or more wireless communication standards associated with the IEEE 802.11 standards to include IEEE 802.11ad.

According to some examples, the example first apparatus may also include a memory capable of storing the first list of one or more approved devices. For these examples, the memory to include one of a volatile memory or a non-volatile memory.

In some examples, example first methods for a first device to wirelessly dock to a second device may include receiving, at the first device, a first information element (IE) including identification information for the second device. The example first methods may also include comparing the identification information for the second device to a first list of one or more allowed devices for wirelessly docking to the first device. The example first methods may also include modifying a jointly derived PMK based on the comparison indicating the second device is allowed for wirelessly docking to the first device. The example first methods may also include transmitting a modify request message to direct the second device to modify the PMK. The example first methods may also include authenticating the second device using the modified PMK. The example first methods may also include wirelessly docking to the second device based on a successful authentication.

According to some examples, the example second methods may also include receiving the first IE including the identification information in a probe response message associated with a P2P device discovery initiated by the first device via transmission of a probe request message.

In some examples for the example second methods, the probe request message may have a second IE including identification information for the first device, the probe response message sent by the second device based on a comparison of the identification information for the first device to a second list of approved devices for wirelessly docking to the second device.

According to some examples for the example second methods, the first list may be maintained at the first device and the second list may be maintained at the second device.

In some examples for the example second methods, the identification information for the first and second devices may separately include identifier information based on one or more of a vendor identification, a product family identification, a product identification or a media access control (MAC) address for the second device.

According to some examples for the example second methods, the first and second devices may be capable of operating in compliance with at least one or more wireless communication standards associated with the Institute of Electrical and Electronic Engineers (IEEE) 802.11 standards.

In some examples for the example second methods, the modify request message may include a directive for the second device to modify the PMK jointly derived from a key generated by an EAP method in accordance with at least one or more wireless communication standards associated with the IEEE 802.11 standards to include IEEE 802.11i.

According to some examples for the example second methods, the directive may include the second device to modify the PMK by one of an XOR logical operation with a pre-shared key maintained at both the first and second devices, implement a hash function using the pre-shared key, implement an algorithm included in the directive or concatenate information included in the directive to the PMK.

In some examples for the example second methods, the first device may authenticate the second device via a four-way handshake process in accordance with IEEE 802.11i using the modified PMK.

According to some examples for the example second methods, wirelessly docking to the second device may include wirelessly docking in accordance with at least one or more wireless communication standards associated with the IEEE 802.11 standards to include IEEE 802.11ad.

In some examples for the example second methods, the first device may be a computing device to include one of a personal computer (PC), a server, a media center, an ultra-mobile PC, a notebook, a desktop, a mobile internet device, a netbook a tablet or an ultrabook.

According to some examples for the example second methods, the second device may be an input/output device to include at least one of a keyboard, a mouse, a joystick, a trackball, a gaming controller, a remote, a touchscreen, a biometric reader, a barcode reader, a printer, a scanner, a fax, a copier, a digital still camera, a video camera, a web camera, a security camera, network accessible storage, an access point, a router, a switch, a gateway, a television, an electronic picture frame, a projector, a monitor, a set-top box, a media server, a portable video player, a game console, a portable gaming device, a smartphone, an audio receiver, one or more audio speakers, portable music player, an audio headset with headphones and microphone, headphones, a microphone a media kiosk or a computing docking station.

In some examples, a first at least one machine readable medium may include a plurality of instructions that in response to be being executed on a system for a first device to wirelessly dock to a second device may cause the system to receive, at the first device, a first information element (IE) including identification information for a second device capable of wirelessly docking to the first device. The instructions may also cause the system to compare the identification information for the second device to a first list of one or more allowed devices for wirelessly docking to the first device. The instructions may also cause the system to modify a jointly derived PMK based on the comparison indicating the second device is allowed for wirelessly docking to the first device. The instructions may also cause the system to transmit a modify request to direct the second device to modify the PMK. The instructions may also cause the system to authenticate the second device using the modified PMK. The instructions may also cause the system to wirelessly dock to the second device if successfully authenticated.

According to some examples, the first at least one machine readable medium may also cause the system to transmit a probe request message associated with a P2P device discovery. The received first IE may have been included in a probe response message transmitted by the second device responsive to receiving the probe request message.

In some examples for the first at least one machine readable medium, the probe request message may have a second IE including identification information for the first device. The probe response message may have been sent by the second device based on a comparison of the identification information for the first device to a second list of approved devices for wirelessly docking to the second device.

According to some examples for the first at least one machine readable medium, the identification information for the first and second devices may separately include identifier information based on one or more of a vendor identification, a product family identification, a product identification or a MAC address for the second device.

In some examples for the first at least one machine readable medium, the first and second devices may be capable of operating in compliance with at least one or more wireless communication standards associated with the IEEE 802.11 standards to include IEEE 802.11i or IEEE 802.11ad.

According to some examples for the first at least one machine readable medium, the modify request message may include a directive for the second device to modify the PMK jointly derived from a key generated by an EAP method. For these examples, the directive may include the second device to modify the PMK by one of an XOR logical operation with a pre-shared key maintained at both the first and second devices, implement a hash function using the pre-shared key, implement an algorithm included in the directive or concatenate information included in the directive to the PMK.

In some examples for the first at least one machine readable medium, the second device may be authenticated via a four-way handshake process in accordance with IEEE 802.11i using the modified PMK.

In some examples, an example second apparatus for a first device to wirelessly dock to a second device may include means for receiving, at the first device, a first information element (IE) including identification information for the second device. The example second apparatus may also include means for comparing the identification information for the second device to a first list of one or more allowed devices for wirelessly docking to the first device. The example second apparatus may also include means for modifying a jointly derived PMK based on the comparison indicating the second device is allowed for wirelessly docking to the first device. The example second apparatus may also include means for causing the first device to transmit a modify request message to direct the second device to modify the PMK. The example second apparatus may also include means for authenticating the second device using the modified PMK. The example second apparatus may also include means for causing the first device to wirelessly dock to the second device based on a successful authentication.

According to some examples, the example second apparatus may also include means for causing the first device to transmit a probe request message associated with a P2P device discovery. For these examples, the received first IE included in a probe response message transmitted by the second device responsive to receiving the probe request message.

In some examples for the example second apparatus, the probe request message may have a second IE including identification information for the first device. The probe response message may have been sent by the second device based on a comparison of the identification information for the first device to a second list of approved devices for wirelessly docking to the second device.

According to some examples for the example second apparatus, the first and second devices may be capable of operating in compliance with at least one or more wireless communication standards associated with the IEEE 802.11 standards to include IEEE 802.11i or IEEE 802.11ad.

In some examples for the example second apparatus, the modify request message may include a directive for the second device to modify the PMK jointly derived from a key generated by an EAP method. For these examples, the directive may include the second device to modify the PMK by one of an XOR logical operation with a pre-shared key maintained at both the first and second devices, implement a hash function using the pre-shared key, implement an algorithm included in the directive or concatenate information included in the directive to the PMK.

According to some examples for the example second apparatus, the second device may be authenticated via a four-way handshake process in accordance with IEEE 802.11i using the modified PMK.

In some examples, an example third apparatus a first device to wirelessly dock to a second device may include circuitry. For these examples, a probe component may be executed by the circuitry to receive a probe request message from the second device in association with a P2P device discovery and cause a probe response message to be transmitted responsive to the probe request message. The probe response message may include a first IE having identification information for the first device. A modify component may also be executed by the circuitry to receive a modify request message from the second device to modify a jointly PMK and modify the PMK based on a directive included in the modify request message. An authenticate component may also be executed by the circuitry to implement an authentication process with the second device using the modified PMK. A dock component may also be executed by the circuitry to cause the first device to wirelessly dock to the second device based on a successful authentication.

According to some examples, the example third apparatus may also include a list component to be executed by the circuitry. The list component may determine whether the second device is allowed to wirelessly dock based on a second IE included in the probe request having identification information for the second device. The identification for the second device may indicate the second device is included on a first list of allowed devices for wirelessly docking to the first device. The list component may then indicate the second device is on the allowed list that may then result in the probe component to cause the probe response message to be transmitted to the second device.

According to some examples, the example third apparatus may also include a memory capable of storing the first list of one or more allowed devices, the memory to include one of a volatile memory or a non-volatile memory.

According to some examples for the example third apparatus, the modify request message may be received from the second device based on the second device comparing the identification information for the first device received with the probe response to a second list of allowed devices for wirelessly docking to the second device and transmitting the modify request message responsive to the identification information for the first device indicating the first device is included on the second list.

In some examples for the example third apparatus, the first and second devices may be capable of operating in compliance with at least one or more wireless communication standards associated with the IEEE 802.11 standards to include IEEE 802.11i or IEEE 802.11ad.

According to some examples for the example third apparatus, the directive included in the modify request message may direct the modify component to modify the PMK jointly derived from a key generated by an EAP method. For these examples, the modify component may modify the PMK by one of an XOR logical operation with a pre-shared key maintained at both the first and second devices, implement a hash function using the pre-shared key, implement an algorithm included in the directive or concatenate information included in the directive to the PMK.

In some examples for the example third apparatus, the authenticate component to implement the authentication process via a four-way handshake process in accordance with IEEE 802.11i using the modified PMK.

In some examples, example second methods for a first device to wirelessly dock to a second device may include transmitting, at the first device, a first IE including identification information for the first device. The example second methods may also include receiving a modify request message from the second device to modify a jointly derived PMK. The example second methods may also include modifying the PMK based on a directive included in the modify request message. The example second methods may also include implementing an authentication process with the second device using the modified PMK. The example second methods may also include wirelessly docking to the second device based on a successful authentication with the second device.

According to some examples, the example second methods may also include transmitting the first IE with a probe response message that is responsive to a probe request sent by the second device in association with a peer-to-peer (P2P) device discovery initiated by the second device.

In some examples for the example second methods, the probe request message may have a second IE including identification information for the second device. For these examples, transmitting the first IE with the probe response message may be based on the identification information for the second device indicating the second device is listed on a first list of allowed devices for wirelessly docking to the first device.

According some examples for the example second methods, the modify request message may be received from the second device based on the second device comparing the identification information for the first device received with the probe response to a second list of allowed devices for wirelessly docking to the second device and transmitting the modify request message responsive to the identification information for the first device indicating the first device is included on the second list.

In some examples for the example second methods, the list may be maintained at the second device and the second list may be maintained at the first device.

According to some examples for the example second methods, the identification information for the first and the second devices may separately include identifier information based on one or more of a vendor identification, a product family identification, a product identification or a media access control (MAC) address.

In some examples for the example second methods, the first and second devices may be capable of operating in compliance with at least one or more wireless communication standards associated with the Institute of IEEE 802.11 standards.

According to some examples for the example second methods, the modify request message may direct the first device to modify the PMK derived from a key generated by an extensible authentication protocol (EAP) method in accordance with at least one or more wireless communication standards associated with the IEEE 802.11 standards to include IEEE 802.11i.

In some examples for the example second methods, the directive may include the first device to modify the PMK by one of an XOR logical operation with a pre-shared key maintained at both the first and second devices, implement a hash function using the pre-shared key, implement an algorithm included in the directive or concatenate information included in the directive to the PMK.

According to some examples for the example second methods, the second device authenticating the first device via a four-way handshake process in accordance with IEEE 802.11i using the modified PMK.

In some examples for the example second methods, wirelessly docking to the second device may include wirelessly docking in accordance with at least one or more wireless communication standards associated with the IEEE 802.11 standards to include IEEE 802.11ad.

According to some examples for the example second methods, the first device may be an input/output device and the second device may be a computing device.

In some examples, a second at least one machine readable medium may include a plurality of instructions that in response to be being executed on a system for a first device to wirelessly dock to a second device may cause the system to transmit, at the first device, a first IE including identification information for the first device. The instructions may also cause the system to receive a modify request message based on the second device comparing the identification information for the first device received with the first IE to a first list of allowed devices for wirelessly docking to the second device and transmitting the modify request message responsive to the identification information for the first device indicating the first device is included on the second list. The modify request message may include a directive to modify a jointly derived PMK. The instructions may also cause the system to modify the PMK based on the directive. The instructions may also cause the system to implement an authentication process with the second device using the modified PMK. The instructions may also cause the system to wirelessly dock to the second device based on a successful authentication with the second device.

According to some examples, the second at least one machine readable medium may also cause the system to transmit the first IE with a probe response message responsive to a probe request sent by the second device in association with a P2P device discovery initiated by the second device.

In some examples for the second at least one machine readable medium, the probe request message may have a second IE including identification information for the second device, the instructions to cause the system to transmit the first IE with the probe response message based on the identification information for the second device indicating the second device is listed on a second list of approved devices for wirelessly docking to the first device.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. An apparatus comprising:
   circuitry for a first device;
   a memory to store instructions operable on the circuitry, the instructions, when executed, cause the circuitry to:
   determine whether a second device is approved for wirelessly docking to the first device based, at least in part, on a first list indicating that the second device is approved;
   modify a jointly derived pairwise master key (PMK) based, at least in part, on the determination indicating the second device is approved for wirelessly docking to the first device and to send a directive including a shared algorithm or concatenate information, the directive to direct the second device to modify another instance of the jointly derived PMK to generate a same modified jointly derived PMK based on the shared algorithm or concatenate information;
   authenticate the second device using the same modified jointly derived PMK modified by the second device; and
   cause the first device to wirelessly dock to the second device based, at least in part, on a successful authentication.

2. The apparatus of claim 1, the circuitry to receive a first information element (IE), wherein the first IE includes identification information for a second device.

3. The apparatus of claim 2, the circuitry to compare the identification information for the second device to the first list of one or more devices to determine whether the second device is approved for wirelessly docking to the first device.

4. The apparatus of claim 2,
   the circuitry to cause the first device to transmit a probe request message associated with a peer-to-peer (P2P) device discovery, the received first IE included in a probe response message transmitted by the second device responsive to receiving the probe request message.

5. The apparatus of claim 4, the probe request message having a second IE including identification information for the first device, the probe response message sent by the second device based, at least in part, on a comparison of the identification information for the first device to a second list of devices for wirelessly docking to the second device.

6. The apparatus of claim 5, the identification information for the first and second devices to separately include identifier information based, at least in part, on one or more of a vendor identification, a product family identification, a product identification or a media access control (MAC) address for the second device.

7. The apparatus of claim 1, the first and second devices capable of operating in compliance with at least one or more wireless communication standards, and circuitry to send the directive to direct the second device to modify the another instance of the jointly derived PMK generated by an extensible authentication protocol (EAP) method in accordance with at least one or more wireless communication standards.

8. The apparatus of claim 7, the circuitry to authenticate the second device via a four-way handshake process using the same modified jointly derived PMK.

9. The apparatus of claim 7, the circuitry to cause the first device to wirelessly dock to the second device in accordance with at least one or more wireless communication standards.

10. A method comprising:
receiving, at a first device, a first information element (IE);
determining whether a second device is approved for wirelessly docking to the first device based, at least in part, on the first IE indicating that the second device is approved;
modifying a jointly derived pairwise master key (PMK) based, at least in part, on the determination indicating the second device is approved for wirelessly docking to the first device;
transmitting a modify request message comprising a directive including a shared algorithm or concatenate information, the directive to direct the second device to modify another instance of the jointly derived PMK to generate a same modified jointly derived PMK based on the shared algorithm or concatenate information;
authenticating the second device using the same modified jointly derived PMK; and
wirelessly docking to the second device based, at least in part, on a successful authentication.

11. The method of claim 10, wherein the first IE includes identification information for the second device.

12. The method of claim 11, wherein determining whether the second device is approved for wirelessly docking to the first device comprises comparing the identification information for the second device included in the first IE to a first list of one or more devices.

13. The method of claim 10, comprising receiving the first IE including identification information in a probe response message associated with a peer-to-peer (P2P) device discovery initiated by the first device via transmission of a probe request message.

14. The method of claim 13, comprising the probe request message having a second IE including identification information for the first device, the probe response message sent by the second device based, at least in part, on a comparison of the identification information for the first device to a second list of devices for wirelessly docking to the second device.

15. The method of claim 14, wherein the first list is maintained at the first device and the second list is maintained at the second device.

16. The method of claim 14, comprising the identification information for the first and second devices to separately include identifier information based, at least in part, on one or more of a vendor identification, a product family identification, a product identification or a media access control (MAC) address for the second device.

17. The method of claim 10, comprising the first and second devices capable of operating in compliance with at least one or more wireless communication standards, the modify request message including the directive to direct the second device to modify the another instance of the jointly derived PMK jointly derived from a key generated by an extensible authentication protocol (EAP) method.

18. The method of claim 17, comprising the first device authenticating the second device via a four-way handshake process using the same modified jointly derived PMK.

19. The method of claim 17, wirelessly docking to the second device comprises wirelessly docking in accordance with at least one or more wireless communication standards.

20. An apparatus comprising:
circuitry for a first device;
a memory to store instructions operable on the circuitry, the instructions, when executed, cause the circuitry to:
transmit a probe response message in response to receipt of a probe request message from a second device receive, wherein the probe response message includes a first information element (IE);
receive a modify request message comprising a directive including a shared algorithm or concatenate information from the second device to modify a jointly derived pairwise master key (PMK) and modify the jointly derived PMK based, at least in part, on the directive to generate a same modified jointly derived PMK;
implement an authentication process with the second device using the same modified jointly derived PMK; and
cause the first device to wirelessly dock to the second device based, at least in part, on a successful authentication.

21. The apparatus of claim 20, wherein the probe request message is received in association with a peer-to-peer (P2P) device discovery.

22. The apparatus of claim 20, wherein the first IE includes identification information for the first device.

23. The apparatus of claim 20, the circuitry
to determine whether the second device is allowed to wirelessly dock based, at least in part, on a second IE included in the probe request having identification information for the second device that indicates the second device is included on a first list of allowed devices for wirelessly docking to the first device and indicate the second device is allowed to cause the circuitry to cause the probe response message to transmit to the second device.

24. The apparatus of claim 23,
the memory capable of storing the first list of one or more allowed devices, the memory to include one of a volatile memory or a non-volatile memory.

25. The apparatus of claim 23, the modify request message received from the second device based, at least in part, on a comparison, by the second device, of the identification information for the first device received with the probe response to a second list of allowed devices for wirelessly docking to the second device and transmission, by the second device, of the modify request message responsive to the identification information for the first device indicating the first device is included on the second list.

26. The apparatus of claim 20, the first and second devices capable of operating in compliance with at least one or more wireless communication standards.

27. The apparatus of claim 26, the directive included in the modify request message to cause the circuitry to modify the jointly derived PMK jointly derived from a key generated by an extensible authentication protocol (EAP) method.

28. The apparatus of claim 27, the circuitry to implement the authentication process via a four-way handshake process using the modified jointly derived PMK.

29. At least one non-transitory machine readable medium comprising a plurality of instructions that in response to being executed on a system for a first device cause the system to:
transmit, at a first device, a first information element (IE) including identification information for the first device;
receive a modify request message in response to a determination indicating that the first device is included in a first list of allowed devices for wirelessly docking to a second device, the modify request message including a directive to modify a jointly derived pairwise master key (PMK) including a shared algorithm or concatenate information, wherein the determination is based, at least in part, on the first IE indicating that the first device is approved;

modify the jointly derived PMK based, at least in part, based on the directive to generate a same modified jointly derived PMK based on the shared algorithm or the concatenate information;

implement an authentication process with the second device using the same modified jointly derived PMK; and wirelessly dock to the second device based, at least in part, on a successful authentication with the second device.

30. The at least one non-transitory machine readable medium of claim 29, comprising the instructions to cause the system to transmit the first IE with a probe response message responsive to a probe request message sent by the second device in association with a peer-to-peer (P2P) device discovery initiated by the second device.

31. The at least one non-transitory machine readable medium of claim 30, comprising the probe request message having a second IE including identification information for the second device, the instructions to cause the system to transmit the first IE with the probe response message based, at least in part, on the identification information for the second device indicating the second device is listed on a second list of approved devices for wirelessly docking to the first device.

* * * * *